United States Patent

[11] 3,563,515

[72] Inventors William D. Chapman
 Au Gres;
 Leon Yablonski; Owen W. Rohn; Richard
 J. Balazer, Saginaw, Mich.
[21] Appl. No. 757,603
[22] Filed Sept. 5, 1968
[45] Patented Feb. 16, 1971
[73] Assignee Baker Perkins, Inc.
 Saginaw, Mich.
 a corporation of New York

[54] MIXING MACHINE
 17 Claims, 5 Drawing Figs.
[52] U.S. Cl. ................................................. 259/104;
 18/12
[51] Int. Cl. ................................................. B01f 7/02
[50] Field of Search .......................................... 259/1, 6, 9,
 10, 41, 45, 46, 104, 109, 110, 178, 179; 18/12
 (SH), 12 (SP)

[56] References Cited
UNITED STATES PATENTS
2,027,185  1/1936  Loomis ........................ 259/104
2,794,626  6/1957  Sterritt ........................ 259/104

Primary Examiner—Edward L. Roberts
Attorney—Learman, Learman & McCulloch

ABSTRACT: A mixing machine including a generally horizontally disposed mixing trough having a pair of independently driven mixing elements journaled in one end wall of the mixing trough. The opposite end wall of the mixing trough may be moved relative to the first-mentioned end wall and mixing elements for purposes of cleaning. Also, the assembly of the mixing trough, mixing elements, and associated drive means may be tilted relative to the remainder of the machine for emptying the mixed constituents therefrom.

INVENTORS
WILLIAM D. CHAPMAN
LEON YABLONSKI
OWEN W. ROHN
RICHARD J. BALAZER
BY- Their Attorneys,
Learman, Learman & McCulloch

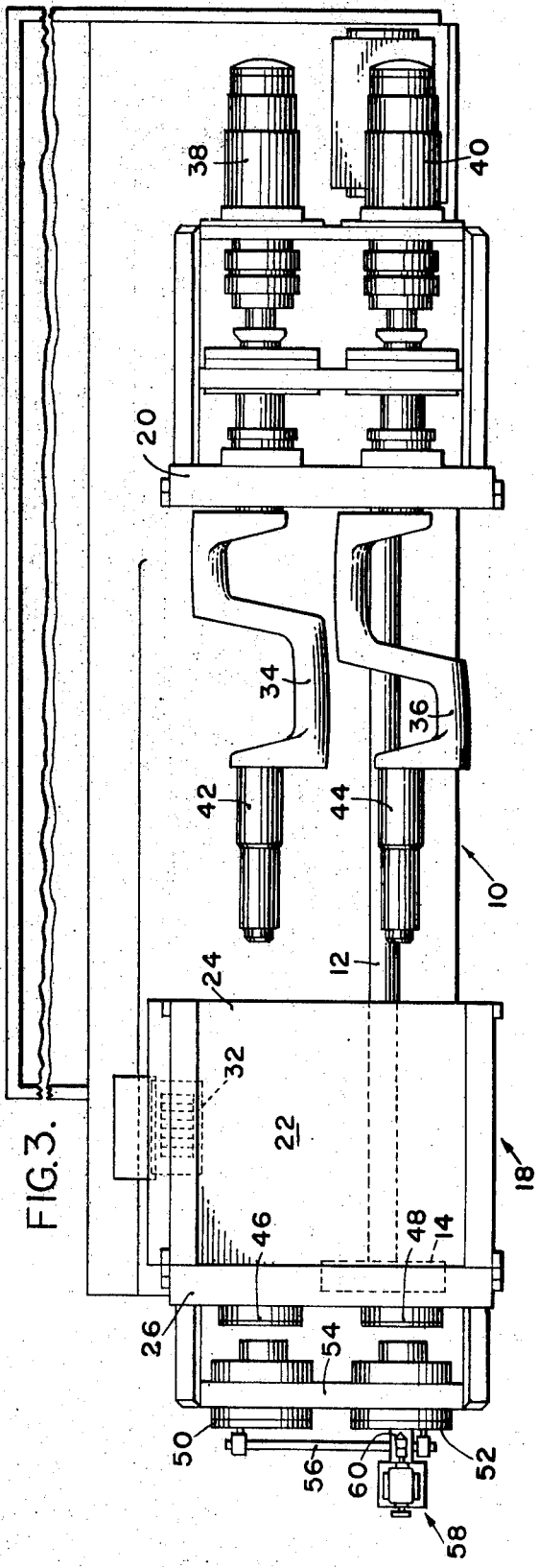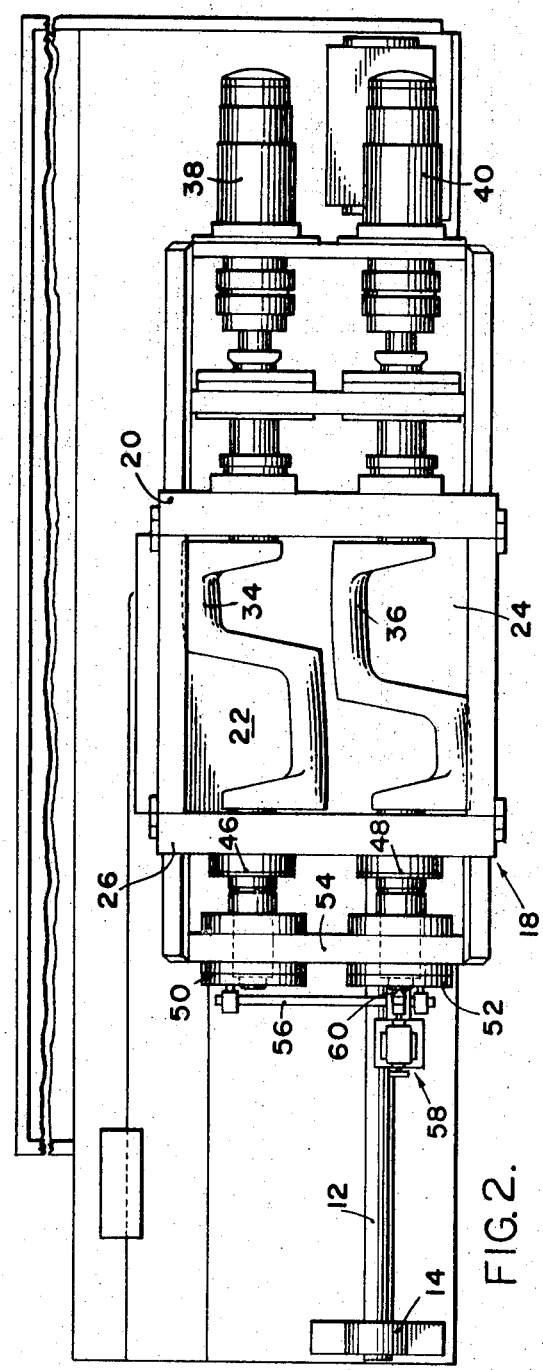

MIXING MACHINE

One of the prime objects of the invention is to provide tangential blade mixers, which require large driving torques and must be readily tiltable and cleanable, with independently hydraulically driven mixer shafts capable of being driven at different relative speeds or speed ratios, and in different or like directions of rotation dependent on the mixing operation to be preformed.

Another object of the invention is to provide a mixer of the type described which is capable of utilizing relatively lightweight drive units providing the necessary torque without interfering with the ease of tiltability of the mixer trough.

Still another object of the invention is to provide a reliable and efficient mixer of this type incorporating a transversely movable and tiltable shaft speed indicating device which enables the proper shaft speed ratios to be set for various mixing operations.

BRIEF DESCRIPTION OF THE DRAWINGS

Other objects and advantages of the invention will become readily apparent to one skilled in the art from reading the following detailed description of an embodiment of the invention when considered in light of the accompanying drawings, in which:

FIG. 2 is a top plan view of the machine illustrated in FIG. 1;

FIG. 3 is a top plan view similar to FIG. 2 showing the mixing trough moved to a cleaning position away from one end wall thereof;

DESCRIPTION OF THE PREFERRED EMBODIMENT

Figure 1:
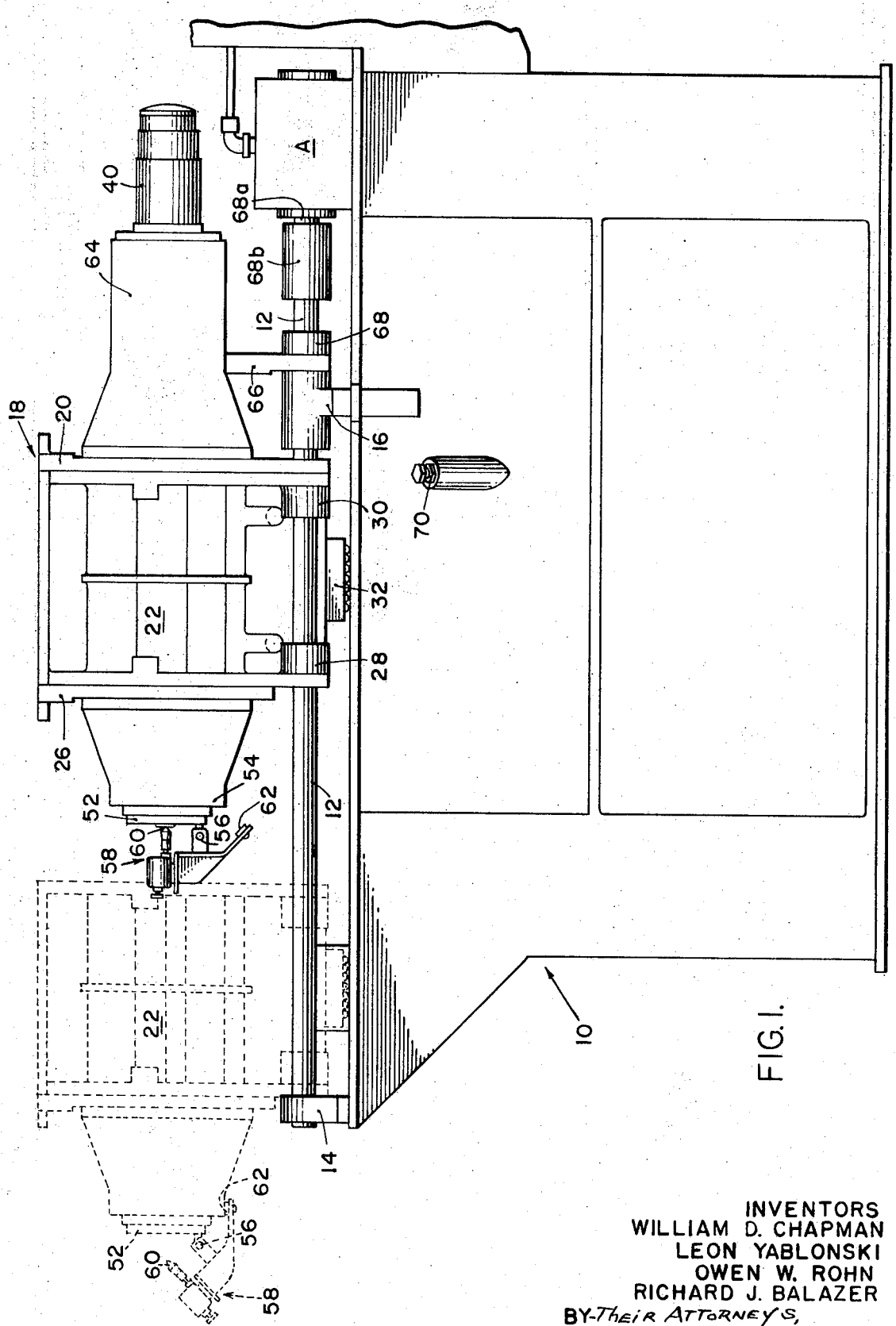
FIG. 1 is an elevational view of a mixing machine incorporating the features of the invention.

There is illustrated in the drawings a mixing machine which includes a base generally designated by reference number 10. Suitable affixed to the base 10 is a horizontally extending, rotatable guide rod 12. The guide rod 12 is supported from the base by a pair of spaced apart bearings 14 and 16. A mixing trough or chamber generally designated by reference number 18 is also supported by the base 10 and secured to the guide rod 12. The trough 18 includes a stationary end wall 20 and an endwisely or longitudinally movable structure 22. The structure 22 includes a central trough element 24 and an associated end wall 26. Depending from the bottom portion of the trough 18 is a pair of spaced apart ball bushing members 28 and 30 which are adapted to slide on the longitudinal axis of the guide rod 12. The weight of the trough 18 may be, in part, transmitted to the base 10 by a pair of support pads 32 depending from the bottom of the trough 18 an support posts 32a.

A pair of oppositely rotatable, nonintersecting path, sigma blade mixer shafts 34 and 36 have one of their respective ends adapted to extend through the stationary wall 20 and are drivingly coupled to separate hydraulic motors 38 an 40, respectively. The opposite free ends 42 and 44 of the shafts 34 and 36, respectively, are journaled within bearing units 46 and 48 mounted in the end wall of the movable trough structure 22.

The extreme terminal portions of the shaft ends 42 and 44 are further caused to project outwardly through suitable mountings 50 and 52 affixed to a frame 54 integral with the movable trough structure. 22. A generally horizontally disposed slide rod 56 is mounted to extend transversely between and on the outer surfaces of the mountings 50 and 52.

A conventional shaft rotation counting device or tachometer 58 is mounted for slidable transverse and also pivotal movement on the slide rod 56. The rotation counting device 58 is provided with the usual rotatable center 60 which is selectively engageable in a conical opening in the respective mixing shaft ends 42 and 44 when the device 58 is pivoted to upper operative position. The device 58 may be readily manually pivoted downwardly to an inoperative position, as illustrated in dotted lines in FIG. 1, and then shifted along the longitudinal axis of the slide rod 56 to a position where the center 60 aligns with the conical opening of the end 44 of the mixer shaft 36, and then pivoted upwardly so that the center 60 engages the end 44, as illustrated in full lines in FIGS. 1 and 2. In the inoperative position of the counting device 58, a pad 62 mounted thereon is caused to contact and rest against the outer surface of the mounting 52.

The means for coupling the mixing shafts 34 and 36 to the respective hydraulic motors 38 and 40 is contained within a housing 64 having a depending supporting arm 66. A lower portion of the arm 66 is fixed to the guide rod 12 between the bracket 16 and a fixed stop member 68 so that the assembly of the motors 38 and 40, mixing shafts 34 and 36, and the housing 64 pivot with the guide rod 12, but any longitudinal movement thereof along the guide rod 12 is prevented. A rotary actuator A is provided to rotate rod 12 in a manner which will be described presently and has an output shaft 68a coupled to the rod 12 as at 68b. When the entire assembly of the mixing trough structure 18, the hydraulic motors 38 and 40, housing 52, and housing 64 is pivoted to an emptying position, the assembly is supported by an adjustable stop mechanism 70 integral with the base 10 of the machine, as illustrated in dotted lines in FIG. 4.

Figure 5:
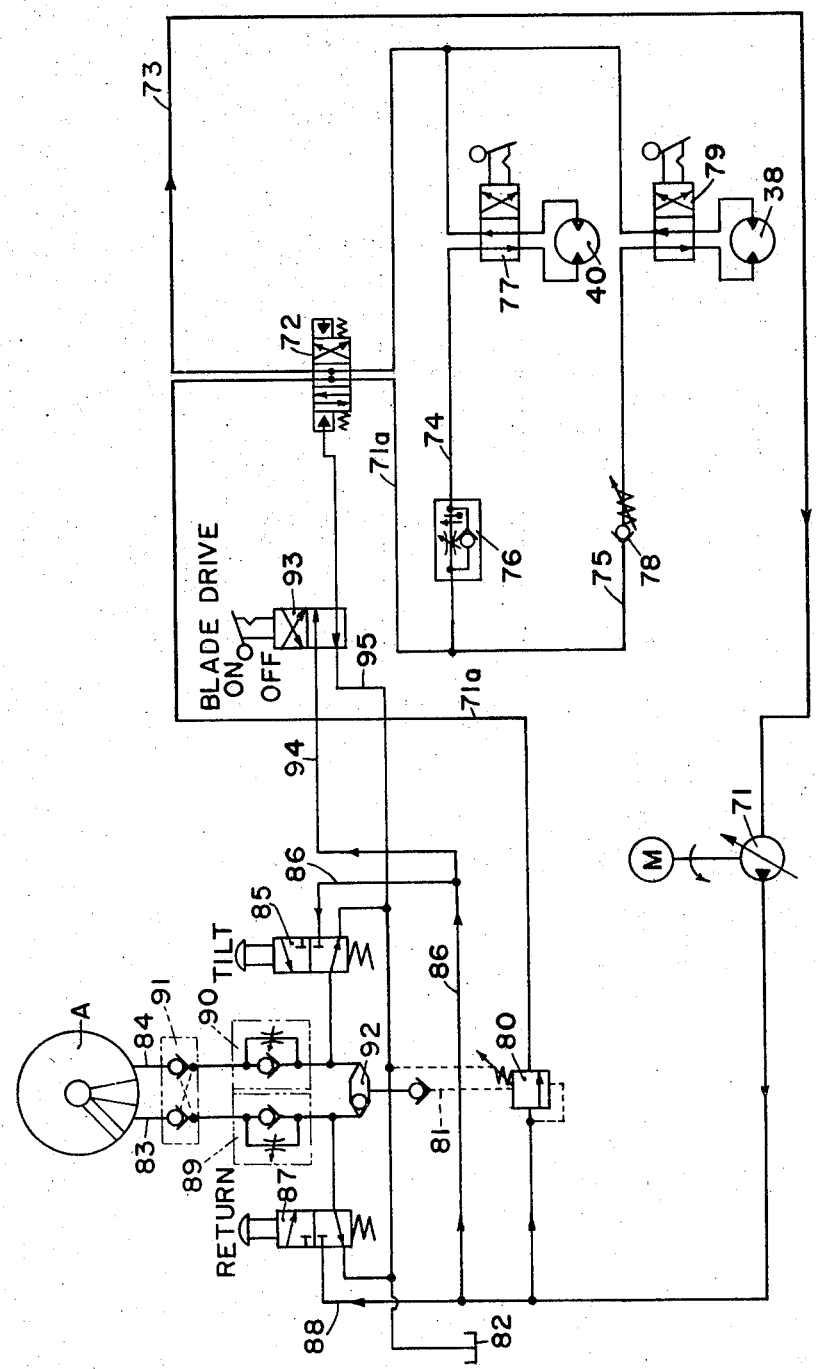
FIG. 5 is a schematic c hydraulic system illustrating the manner in which the mixer shafts are driven.

In FIG. 5 we have shown a typical schematic diagram of a hydraulic system which is capable of driving the mixer shafts 34 and 36 in the manner desired. The system includes a variable volume pumping unit 71 which is provided to supply oil under driving pressure to the hydraulic motors 38 and 40 which drive the shafts 34 and 36, respectively, and also the rotary actuator A which revolves the trough-tilting shaft 12 through part of a revolution. It will be seen that the oil pressure is supplied from the pump 71 to the motors 38 and 40 via a line 712 through a pilot operated directional control valve 72 which has two operative positions (on or off) and is controlled by a manually operated valve 93 such as the Vickers 4-way valve 0C2-529-C in a line 94 in the usual manner. In the first of these post positions, the motors 38 and 40 are not driven and oil simply returns to the pump 71 through the line 73, while, in the other position of valve 72, oil is supplied to both of the lines 74 and 75 leading to the motors 38 and 40. The pump 71 may be the Vickers adjustable speed drive 0HAS4-5B-E-H3-10manufactured by Vickers Incorporated of Troy, Michigan, U.S.A. while the motors 38 and 40 may be the 1000p.s.i. orbit motors, Model X4X manufactured by Char Lynn Co. of Eden Prairie, Minnesota, U.S.A. Provided in the line 74 is a temperature an pressure compensated flow control valve 76 such as the Manutrol flow control valve 600-6 3/8 manufactured by Perry-Fay Company of Elyria, Ohio, U.S.A., which meters the flow to the motor 40 and is adjustable to determine the flow to motor 40. Also provided in the line 74 is a manually operated reversing valve 77 which permits the motor 40 to be driven in either direction of rotation.

Provided in line 75 a pressure holding valve 78, such as the Republic relief valve 0632-B 3manufactured by Republic Manufacturing Co. of Cleveland, Ohio, U.S.A., which operates to prevent a no-load condition for motor 38 from dripping the pressure in line 75 below that required by the pressure compensating and flow control valve 76. It is the valve 76 which is manually adjustable to determine the speed of motor 40. With the speed of motor 40 controlled, motor 38 will then run at a speed according to the remaining volume of oil supplied by pump 71. Since pump 71 is a variable volume pump and can also be manually adjusted, the speed of motor 38 is adjusted then by varying the volume of oil supplied by the pump 71. Also provided in line 75 to permit the motor 38 to be driven in either direction of rotation is a manually operable oil direction reversing valve 79.

Normally, the pumping pressure supplied by pump 71 will be motor load pressure and will not be sufficient to also operate the rotary actuator A. Accordingly, a sequence valve 80 which is normally vented at zero pressure in line 71a is provided to achieve a pressure buildup which will permit operation of actuator A without shutdown of motors 38 and 40. The valve 80 normally freely passes oil through to the motors 38 and 40, and through line 81 normally also allows free passage of valve control oil to the reservoir or tank 82. The valve 80 may be an adapted Vickers sequence valve 0CT-06-BY20 and operates in a manner which will be described. The rotary actuator A, which may be the Rotac hydraulic actuator ORN-341V manufactured by Excello Corporation of Greenville, Ohio, U.S.A., is connected with two lines, 83 and 84, through which oil is supplied or egressed, depending on the direction of rotation in which shaft 12 is to revolve. The line 84 is connected with a manually operated directional control trough tilting valve 85 in a line 86 leading from pump 71 in parallel with line 71.2, and the line 83 is similarly connected with another directional control valve 87 in another parallel line 88 leading from pump 71 which, when operated, will return the actuator A and thereby the trough assembly. The valves 85 and 87 may be the Racine 3-way valves 0OD3-STGT-102S manufactured by Hydraulic Machinery Inc. of Racine, Wisconsin, U.S.A. Provided in the lines 83 and 84, respectively, are flow control valves 89 and 90 which control the speed of actuator A by restricting the outflow of oil therefrom. Valve 91 connects in both lines 83 and 84 to hold the actuator A in position when no oil is being supplied through either of the lines 83 or 84. Valve 91 is a conventional double-lock valve and may be the Waterman valve 02712-2 manufactured by Waterman Hydraulics Corporation of Evanston, Illinois, U.S.A. Connected with both lines 83 and 84 is a shuttle control valve 92 which functions to block oil from proceeding to reservoir 82 from line 81 when either of valves 85 or 87 is actuated. The shuttle valve 92, which may be the valve 022-1-2 manufactured by Fluid Power Accessories, Inc., of Wheeling, Illinois, U.S.A., normally vents lines 81 to the reservoir 82, but if the plungers of either of the tilt or return valves 85 or 87 are pressed, it functions to block the vent flow from valve 80. This causes the pressure available to operate rotary actuator A to increase to the point at which rotary actuator A can be operated at the same time that motors 38 and 40 are operated.

For instance, if the trough assembly 22 is in tilted position and it is desired to return it, the valve 87 is pressed, permitting oil from line 88 to proceed to the shuttle valve 92 and block the normal venting flow through line 18. Control oil within the sequence valve 80 can then leave the valve 80 only through the adjustable spring, which is set for a high pressure such as 900 p.s.i., and this raises the pressure in line 88 to 900 p.s.i., which is sufficient pressure to return the actuator A and shaft 12. The pressure is built up in line 86 in the same manner when it is the tilt valve 85 which is depressed.

Figure 4:
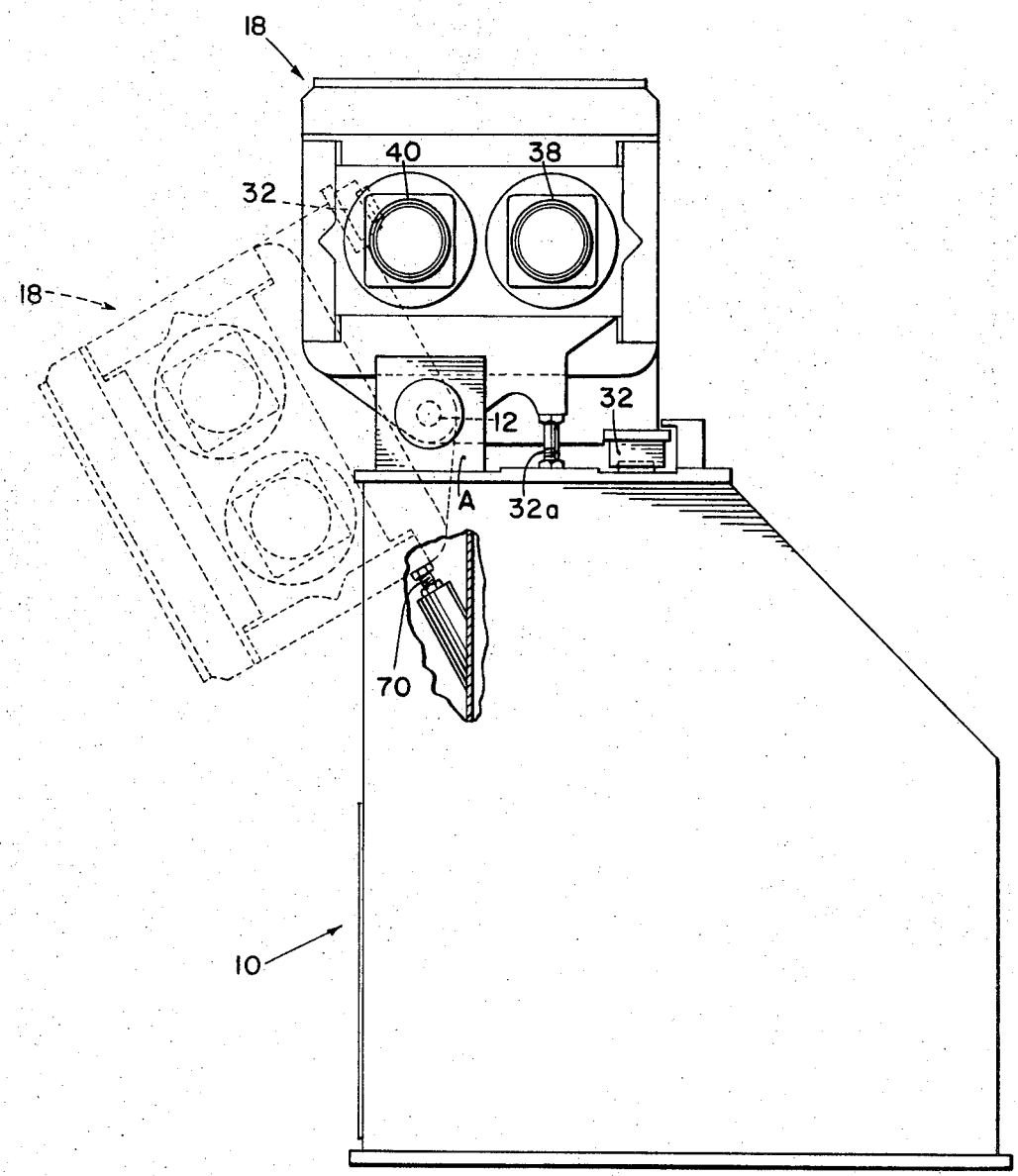
FIG. 4 is an end elevational view of the machine illustrated in FIGS. 1, 2 and 3 showing, in dotted lines, the mixing trough in a tilted position relative to the base of the machine.

In operation, the components of the mixing machine described hereinabove are positioned as illustrated in full lines in FIGS. 1, 2, and 4. The ingredients to be mixed are placed into the mixing trough or chamber 18 and the motors 38 and 40 are suitably energized by hydraulic fluid admitted thereinto through the piping and valving system illustrated in FIG. 5. The mixing element 34 may be caused to rotate in one direction while the mixing element 36 is caused to rotate in an opposite direction. Since each batch of materials may require the mixing elements 34 and 36 to rotate at a given speed relative to the other to effect the best and maximum mixing operation, it is desirable to periodically determine the speed of rotation of the mixing elements. This procedure is achieved by moving the counting device 58 first to monitor one of the mixing elements and then the other. The reading of the device will enable the operator to either determine the respective rotational speeds of the mixing elements; or alternatively, the speed of one mixing element relative to the other. Upon completion of the mixing of a batch, the assembly is pivoted with the guide rod 12 to enable the mixed constituents to be discharged therefrom. The pivoted or tilted position is illustrated in dotted lines in FIG. 4.

When it becomes necessary to clean the mixing chamber 18 and the associated mixing element 34 and 36, the trough 24 and end wall 26 will disengaged from the fixed end wall 20 and moved away therefrom, as illustrated in FIG. 3. In this position, the mixing elements 34 and 36 may be easily and readily cleaned and also the interior of the end walls 20 and 26, and the trough wall 24 may be readily cleaned. After the cleaning operation has been completed, the moveable trough assembly 22 is moved along the guide rod 12 to a position illustrated in FIG. 2 and is ready for the next mixing operation.

In accordance with the provisions of the Patent Statutes, we have explained the principle and mode of operation of our invention and have illustrated and described what we now consider t represent its best embodiment. However, it is to be understood that within the spirit and scope of the appended claims, the invention may be practiced otherwise than as specifically illustrated an described.

We claim:

1. A mixing machine comprising: a base; a horizontally disposed guide affixed to said base; a mixing trough assembly having an end wall separable therefrom; a plurality of mixer shafts in said trough having nonintersecting path mixer elements thereon; and means slidably mounting said mixing trough to said guide whereby said mixing trough may be pivoted relative to said base and relative longitudinal movement may be effected between said trough and said end wall.

2. The invention defined in claim 1 wherein said shafts comprise a pair of independently rotatable mixing elements extending into said mixing trough.

3. The invention defined in claim 2 including means selectively connectable to said mixing elements for monitoring the rotational movement thereof.

4. The invention defined in claim 3 wherein said means for monitoring the rotational movement of said mixing elements includes a transversely extending slide rod movable with said trough, and a mixing element rotation counting device pivotally and slidably mounted on said slide rod.

5. The invention defined in claim 4 wherein said counting device includes center adapted to selectively make physical contact with said mixing elements.

6. A mixing machine comprising: frame means; a tiltable mixing trough assembly mounted thereon; a plurality of mixer shafts extending axially therein and having nonintersecting path mixer members; a separate hydraulic motor mounted by each shaft for rotating each shaft about its axis independently of the other shaft; and a common hydraulic system connected with each drive means operative to drive each shaft at a different variable speed.

7. The combination defined in claim 6 in which said hydraulic system includes means for driving said shafts in different directions of rotation.

8. The combination defined in claim 6 in which a rotatable guide rod is journaled on said frame means; said trough assembly has an end wall separable therefrom; and means mounts said trough assembly on said guide rod in a manner to permit sliding separation of said end wall and tilting of said trough assembly with rotation of said rod.

9. The combination defined in claim 8 in which a rotary hydraulic actuator is connected to said guide rod; and said hydraulic system is connected therewith and drives said actuator at a time when said motors are being driven.

10. The combination defined in claim 9 in which separate control valves operate to revolve said guide rod through part of a revolution and return it; and sequence valve means is operable to provide a pressure increase permitting said actuator and motors to be simultaneously driven.

11. The combination defined in claim 6 in which variable volume pump means powers the hydraulic system; flow control means is set to determine a maximum flow to one motor; and the other motor utilizes the remaining flow from the pump.

12. A mixing machine comprising: frame means; a tiltable mixing trough assembly mounted thereon; a plurality of mixer shaft assemblies extending axially in said trough assembly and exposed at one end thereof; separate motor means for driving said shafts; and shaft speed indicating means mounted for transverse movement on said trough assembly to positions of operative engagement with one mixer shaft assembly or the other.

13. The combination defined in claim 12 in which said shaft speed indicating means comprises a transversely extending guide mounted on said trough assembly to extend between said shafts, and a speed of rotation indicating device mounted thereon for sliding movement from one shaft to the other.

14. The combination defined in claim 13 in which said device is also pivotal on said slide into and out of engaged position with each of said shafts.

15. The invention defined in claim 1 wherein said shafts extend into said mixing trough assembly through said one of said end walls.

16. The invention defined in claim 15 wherein said mixing elements are driven by hydraulic motor means operable to effect independent rotation of said mixing elements.

17. the combination defined in claim 1 in which said guide mounts said trough assembly, including said end wall, for pivotal movement, and mounts said trough assembly, excluding said end wall, for sliding movement relative to said end wall.